United States Patent [19]

Eckhardt

[11] 4,380,821

[45] Apr. 19, 1983

[54] TRAFFIC BROADCASTING SYSTEM

[75] Inventor: Gert Eckhardt, Backnang, Fed. Rep. of Germany

[73] Assignee: Licentia Patent-Verwaltungs-G.m.b.H., Frankfurt am Main, Fed. Rep. of Germany

[21] Appl. No.: 171,792

[22] Filed: Jul. 24, 1980

[30] Foreign Application Priority Data

Jul. 27, 1979 [DE] Fed. Rep. of Germany ....... 2930509

[51] Int. Cl.[3] ........................ H04B 3/60; H04B 7/155

[52] U.S. Cl. ................................ 455/33; 179/2 EB; 455/38; 455/56

[58] Field of Search ...................... 455/31, 33, 38, 53, 455/54, 56, 57; 179/2 E, 2 EA, 2 EB, 2 EC

[56] References Cited

U.S. PATENT DOCUMENTS

| | | | |
|---|---|---|---|
| 3,594,495 | 7/1971 | Bond | 455/31 |
| 4,144,409 | 3/1979 | Utano et al. | 455/33 |
| 4,155,042 | 5/1979 | Permut et al. | 455/38 |

OTHER PUBLICATIONS

"S.P.I.-ein Systemzur Senderkennung"-Funkschau 1979, Heft 10-Hans-Erich Kamenzky-pp. 545—546.

*Primary Examiner*—Marc E. Bookbinder
*Attorney, Agent, or Firm*—Spencer & Kaye

[57] ABSTRACT

The present invention comprises a method of transmitting information from a central ground station to at least one mobile auxiliary ground station via at least one base station. The auxiliary ground stations are located within the transmitting range of at least one base station, and are provided with a receiving device having a control unit and a memory. In accordance with this method, a block of messages cyclically repeated within a time frame is transmitted over a single frequency from the central ground station to the base stations. Each of the messages within the block includes an address code which corresponds to the area code of the region adjacent a corresponding base station.

The base stations transmit the block of messages over a single frequency to receiving devices located in the mobile auxiliary ground stations where those messages corresponding to a selected area code are recorded and then played back.

9 Claims, 3 Drawing Figures

Fig. 3

| | FUNCTION | SWITCH / POSITION 7 | 8 | 13 | 14 | 16 |
|---|---|---|---|---|---|---|
| 1 | RECEIVING TERRESTRIAL RADIO | 1 | 1 | 1 | 1 | 1 |
| 2 | RECEIVING SATELLITE RADIO | 2 | 2 | 1 | 1 | 1 |
| | | | | | | |
| 3 | FIRST AREA CODE AFTER SWITCHING ON OR INFORMATION WITH ADDITIONAL CODE | 1/2 | 1/2 | 2 | 2 | 1 |
| 4 | PLAYBACK OF MEMORY CONTENTS | 2 | 1 | 1 | 1 | 2 |
| 5 | INFORMATION WITH PRIORITY SIGNAL | 2 | 1 | 2 | 1 | 1 |

TRAFFIC BROADCASTING SYSTEM

BACKGROUND OF THE INVENTION

The present invention relates to a method for transmitting information which employs one or more terrestrial or satellite base stations. A central ground station and a plurality of preferably mobile auxiliary ground stations are also provided, each of the auxiliary ground stations being located within receiving range of at least one base station. The central ground station transmits to one or more base stations, preferably on a single frequency, information which is combined within a time frame and is in the form of a cyclically repeated block of messages. The information is broadcast by the base station, preferably on a single frequency, and is received by receiving devices in the auxiliary ground stations. A control unit is provided in the receiving devices of the auxiliary ground stations for storing and repeating the information on demand. In addition to the information broadcasts, radio program can be tuned in by the equipment.

It is known to transmit information by employing base stations and mobile ground stations in order to disseminate traffic information to automobile drivers. In this case, traffic information for a large area is broadcast by superregional broadcasting stations, such as, for example, the Deutschlandfunk or Radio Luxembourg. Regional stations can be received only in a limited area and therefore broadcast only a selection of traffic information which relates to their receiving area.

The periodical Funkschau 1971, No. 7 (Pages 193–195) and No. 8 (pages 251–252) describes an automobile driver radio information system which informs drivers by "the push of a button" at selected rest areas on the Autobahn about the traffic situation. In order to store the information on an endless magnetic tape loop, an identification signal is transmitted before and after the traffic information, this signal also being available for control of the memory.

A disadvantage of this known information system is that the person receiving information from a superregional station must listen to information which does not concern him. Further, he may not receive needed information at all in the event his receiving device lies outside the receiving range of a regional station in an area along the route of his trip.

It is an object of the present invention to provide a method for transmitting information which records only that information which relates directly to the person receiving the information, and in which the process of storing and playing back the information is very simple.

SUMMARY OF THE INVENTION

The present invention comprises a method of transmitting information from a central ground station to at least one mobile auxiliary ground station via at least one base station. The auxiliary ground stations are located within the transmitting range of at least one base station, and are provided with a receiving device having a control unit and a memory. In accordance with this method, a block of messages cyclically repeated within a time frame is transmitted over a single frequency from the central ground station to the base stations. Each of the messages within the block includes an address code which corresponds to the area code of the region adjacent a corresponding base station.

The base stations retransmit the block of messages over a single frequency to receiving devices located in the mobile auxiliary ground stations where these messages corresponding to a selected area code are recorded and then played back. That is, the recorded messages are converted to an information signal for use by the operator of the mobile auxiliary ground station. In most cases, the recorded message is played back to provide an information signal in audio form. If the message is changed, the changed message is recorded and played back as an audio information signal to the operator.

The advantages of the disclosed information transmission method are due primarily to the selection of information according to area codes, it not being possible with prior art systems to make a selection according to the individual requirements of the persons receiving the information. With the method of the present invention, it is possible to broadcast information of a type which previously was not included in traffic information broadcasts because the circle of users for that information was too small. With the present invention, there is no reason to restrict the transmission of information only to traffic reports, and weather reports and regional news can also be broadcast. Since the information is transmitted preferably on only one frequency, frequent manual tuning or an expensive search mechanism in the receiving device is not required when travelling from one broadcast area to another. The transmission of information is by time multiplexing which leaves no block of information unconsidered as was the case in prior art systems employing frequency multiplex with regional stations spaced for apart. A further advantage is that the information is stored automatically and can be recalled by the users at times when they can give it their full attention.

BRIEF DESCRIPTION OF THE DRAWINGS

FIG. 3 shows a table with functions of the receiving device.

DESCRIPTION OF THE PREFERRED EMBODIMENTS

Due to the dense occupation of the VHF range, it has not been possible thus far to reach agreement on a fixed transmission channel for traffic information. A satellite transmission system, for example in the UHF range, offers an opportunity to reach all mobile stations, such as those in automobiles, while using only one frequency in the broadcasting range of a geostationary satellite. With the appropriate interconnection of the conventional automobile radio receiver and the receiving device, any desired radio channel and the traffic information can be received simultaneously.

The satellite can continuously broadcast all information for the area covered by its broadcasting range. The individual automobiles can select information identified by the respective area code of the region through which it is travelling or about to travel and only the information of interest is recorded and played back.

The information must be processed in a special manner so that it can be provided as soon as possible in the form of traffic reports to all users such as automobile drivers who start their trips at various times during the day. For this purpose, the information is broadcast in the form of a cyclically repeated time frame. During one frame duration, all information is transmitted in succession, arranged by areas. The reports for the individual areas are preceded by an area code which causes storage and, if desired, simultaneous playback for the driver. In this way, it is assured that each driver receives the information important to him no later than after the duration of one frame. An improvement can be realized only with difficulty unless the system employs a plurality of satellite channels which, in an extreme case, would be one satellite per area. The immediate transmission of the information at the start of a trip would require that the receiving device be switched on at least one frame duration before the starting time or be kept in operation continuously.

Figure 1:
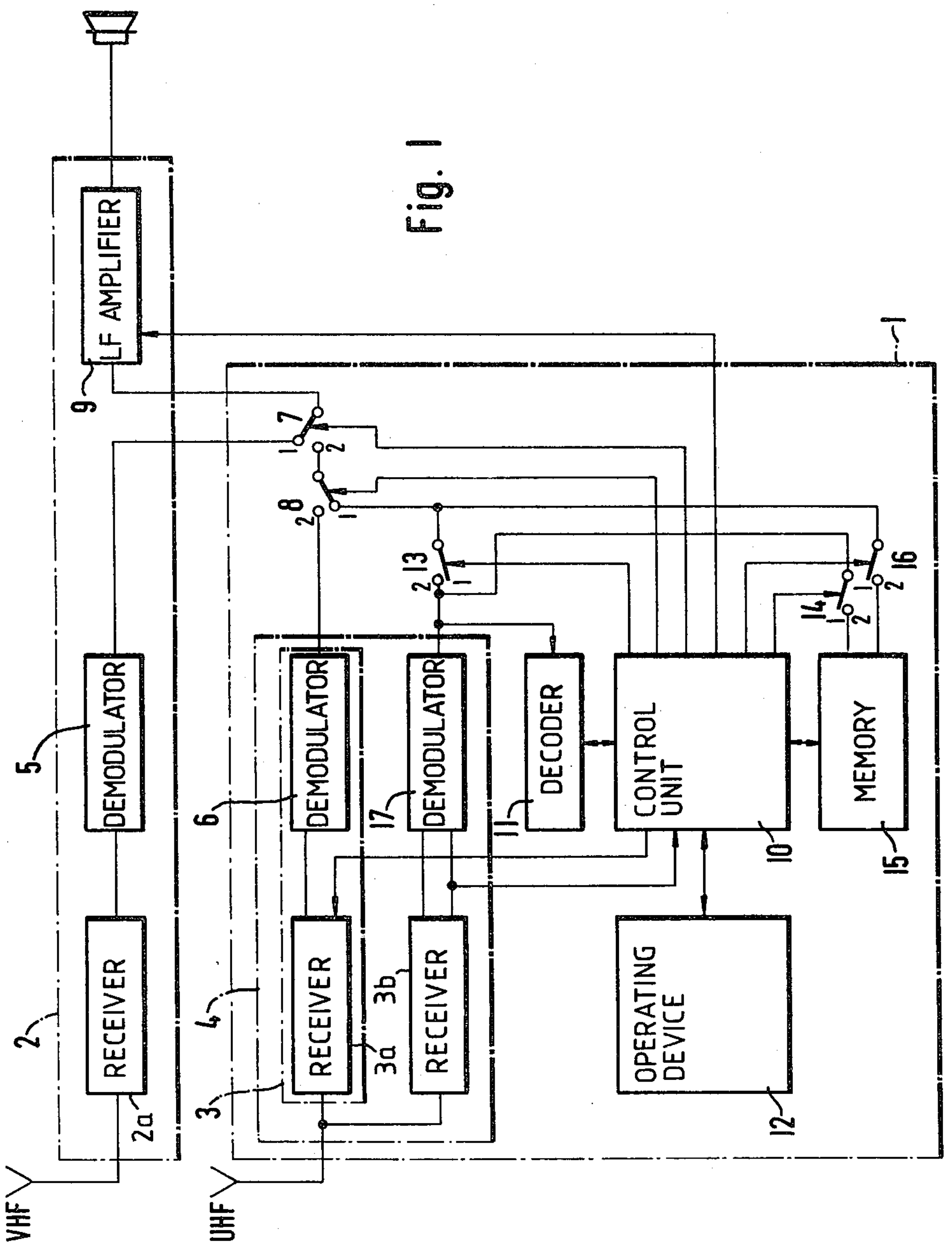
FIG. 1 is a block circuit diagram of the receiving device.
Figure 2:
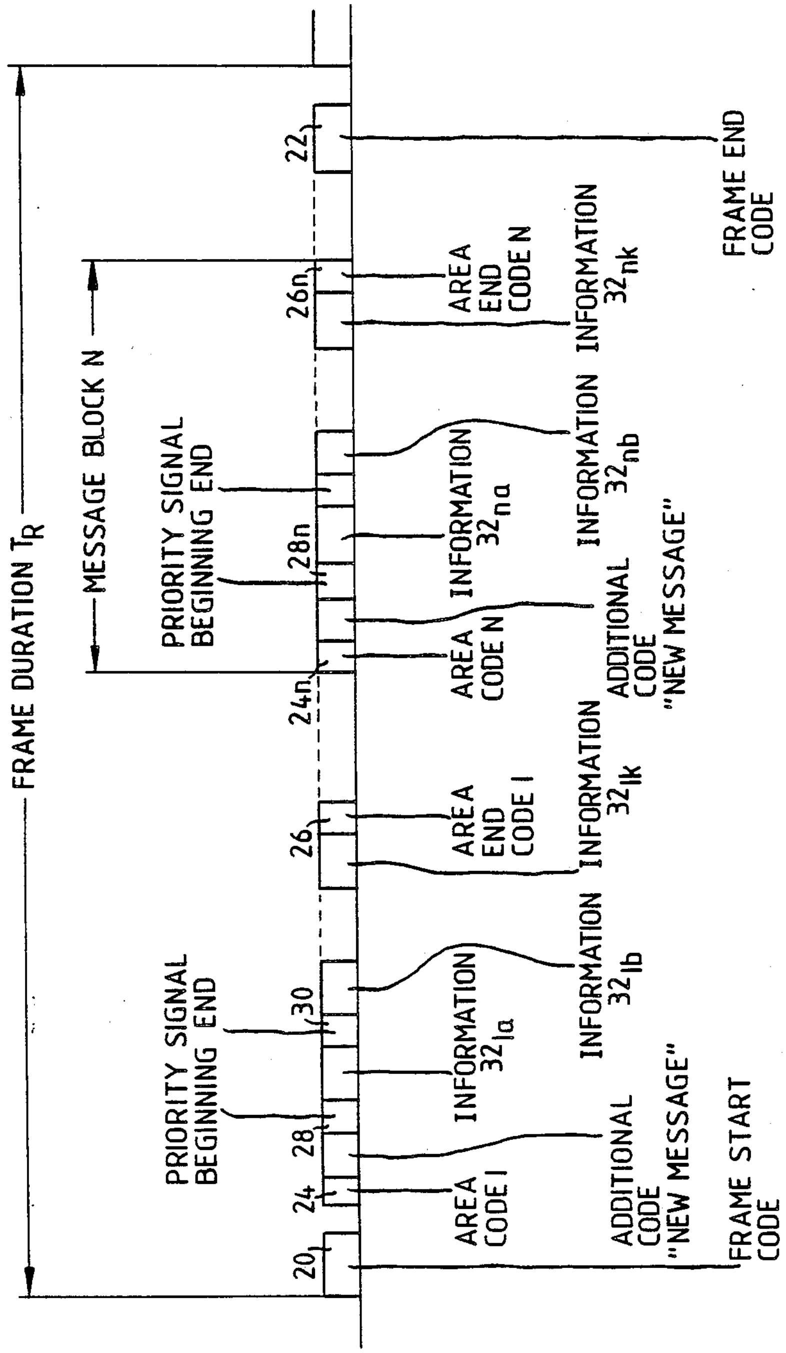
FIG. 2 shows the frame structure of the information blocks with identification signals.

Referring to FIG. 2, which shows the frame structure of the blocks of reports with frame code, area code, additional code for identifying a "new report" and priority signal, the frame duration $T_R$ can be adapted to the number of reports at hand. However, in consideration of the fact that the information is stored in the receiving devices and in view of the response time of the drivers, the individual messenges have a fixed format, e.g. a duration of 10 seconds with a key word at the start. Start and end frame codes are transmitted at the beginning and end of each block of reports in the form of code words 20,22 in order to simplify storage and playback. The reports for each area are preceded and ended by area code words 24,26 to 24_n_,26_n_ and an additional code in the form of a priority signal having a beginning code word 28,28_n_ and an end code word 30,30_n_ causes the receiving device (FIG. 1) to effect immediate playback and provide an additional means for storage.

The sequence of the information $32_{1a}$, $32_{1b}$ . . . $32_{1k}$ for message block 1 for area 1 and the sequence of information $32_{na}$, $32_{nb}$ . . . $32_{nk}$ for message block n for area n can be arranged according to the importance of the information. Each new or superseded piece of information for one area results in a recompilation of the respective area information and the receiving device 1 is caused to rerecord the entire sequence of information. New information is indicated by an additional code and the information can be supplemented by additional statements.

The evaluation of the information with the aid of the receiving device 1 in the mobile ground stations will be explained with the aid of FIG. 1. This figure is a simplified block circuit diagram for the receiving device 1 for the UHF range and the additional radio receiver for the VHF range.

Radio programs are received through either the receiver 2_a_ of the automobile radio 2 or the audio receiver 3_a_ or 3_b_ of the receiver 3 comprising satellite receiver 4. The received signals are demodulated in demodulator 5 or 6 and connected via switches 7 and 8 to the low frequency amplifier 9 of the radio receiver 2. Depending on the position of switches 7 and 8, which are operated by the control unit 10 of the receiving device 1, terrestrial stations or satellite radio channels can be received. The tuning of the satellite channels is also effected by the control unit 10.

Information is received via a permanently tuned portion of the satellite receiver 4 and is demodulated by demodulator 6. The output of the demodulator 17 is continuously monitored by means of a decoder 11 for the presence of information carrying area codes of importance according to the setting of an operating panel or device 12.

Several modes of operation can be attained with this system. At the start of the trip, the system is switched on and the area codes of interest set on the operating panel 12. When one of these area codes is received by the receiving device 1, the entire block of information is recorded in a memory 15 via switch 14 which is switched from position 1 to position 2 by control unit 10. If desired, the information can be made audible at the same time via position 2 of switch 13, position 1 of switch 8 and position 2of switch 7.

During the trip, blocks of messages are recorded only if either an additional code associated with an area code indicates that this is a newor changed report or if there was too much interference in the preceding blockof reports. In addition, reports bearing a priority signal are received and switched through directly to the low frequency amplifier 9 by means of switches 13, 8 and 7.

Playback during the trip is effected, as desired, via switches16, 8 and 7. If during the "playback" mode a new or revised block of reports is received, this block is played back and recorded, the prior information simultaneously being erased in its entirety.

Control unit 10 and memory 15 are important components of the receiving device 1. The control unit 10 essentially comprises switches and sensors, which may be realized by a microcomputer such as INTEL 8049, for switching on and off the various groups of components, selecting the various modes of operation via switches 7, 8, 13, 14 and 16, as well as controlling and monitoring the decoder 11 and memory 15. The operation of these switches is summarized in FIG. 3. The programming and activation of these switches and sensors (i.e., microcomputer) is effected by the operating panel 12 which includes a numerical keyboard for inserting the area codes and keys and luminous displays for selecting the mode of operation and indicating the operating status. For analog transmission, which will be assumed to exist when the memory 15 is described, the decoder 11 comprises filters for detecting sound combinations transmitted outside of the voice range.

The control unit, in conjunction with the operating panel 12, decoder 11 and satellite receiver 4 or radio receiver 2, respectively, switches on the various modes of operation. Except for feeding the respective area codes into the operating device 12, all other functions are automatic.

For longer trips, the control unit 10 can be coupled with the automobile odometer, for example, by indicating the destination of the trip. That is, by feeding in the starting and target areas, the control unit 10 will automatically switch to the various area codes.

The structure and control of the memory are closely related to the structure of the reports and its operation will be explained, assuming that the memory 15 is a tape recorder employing an endless tape cassette. Similar considerations would apply to digital memories.

In the tape recorder, one track is required to record the information for one area and an auxiliary track marks the beginning and end of the block of reports. For operation during long trips with automatic adaptation to the areas traversed, a second track is used on which information is recorded in the transitional area.

At the start of the trip, the tape recorder is started in its "record" mode when it receives the area code. The start of the block of reports is marked and the preceding information is erased. At the end of the block of reports the "record" state is switched off, the end of the information is marked and the tape is stopped. The "erase" state is maintained until the marked beginning is reached again.

For playback during the trip, the receiving device 1, when it receives the instruction "playback" rapidly transports the tape with the erase head switched on initially to the start of the block of information and then plays it back. During the renewed playback, the erase head remains switched off, i.e. after the start of a recording it is switched on for only one passage. If during this mode of operation a new block of reports is received, the device is switched to the "record" state and the sequence is the same as at "start of the trip". The tape position existing at the beginning of a block of messages is marked as the new beginning, and the same applies for the end of the block of reports.

For longer trips, two blocks of reports are recorded in the areas between two area codes. On the basis of the kilometers traversed, one of the two blocks is given preference and this block is recorded on track 1. At the end of the block of reports, the device is stopped and restarted when the second block is received. If a playback takes place in the meantime, the tape is reset to the start when it receives the "playback" instruction. If the second block of reports is received during the time that the first block is being played, the beginning of track 2 is marked when the second block of reports arrives and recording takes place at the same time that track 1 is being played back. If necessary, the mechanism remains switched on to the end of the recording. Thereafter, the start of the reports on track 2 is searched out in the fast forward mode and the reports are then played back.

An important criterion for the memory is its capacity and access time. Employing present-day information transmission systems, a cassette playing time of about 3 minutes is sufficient, particularly since this playing time can easily be doubled if necessary by a second track. The second track is recorded during longer trips with information related to the area being approached.

Using conventional cassette recorders, there will be a playing time of 3 minutes with a fast forward running time of about 10 seconds. Thus, the start of the information can be reached within 10 seconds and playback can begin. Reports including a priority signal are played immediately. They are stored as individual information only if they are included in a block of reports.

The access time for the tape recorder can be shortened if desired. For example, the length of each message may be limited (e.g. to 10 seconds) and a separate track may be used for each recording. The running time of the tape is then 10 seconds, but a plurality of tracks, e.g. 20, must be available. In this way, the access time can be shortened but the controls for the magnetic heads become more complex. Digital recording in solid state memories offers considerable improvements, such as fast erasing, fast access, and flexible organization although, at present, these devices are relatively expensive.

In order to define the frame structure, various regions must be specified within the area being supplied. It is assumed that the amount of information for all areas is approximately the same and that the areas can be easily separated. The amount of expected information determines the magnetic memory recording capacity, and the division into areas must be easily recognizable to the user of the information so that it will be easy to operate the operating device 12.

Two different information planes are employed for the areas: (1) information having purely local significance and (2) information for long-distance travel. The latter would relate to roads outside of cities and towns and the major arteries through the cities and towns.

The information for the individual areas is collected at a central ground station and distributed via the base stations. The distribution is effected in the form of a time frame which is cyclically repeated. The frame duration depends on the amount of information to be transmitted. If no information is available for one area, no report is transmitted. With the aid of the frame beginning and frame end codes 20,22 it can be determined that no information is available for the area in question and this fact is indicated to the information user, if required, by means of an acoustic signal.

The information is transmitted in analog form with parameters similar to those used in a radio broadcast. The various codes are generated by sound modulated subcarriers lying above the transmitted voice band. In order to assure rapid transmission of information, it is necessary that the data be collected and evaluated centrally. The base stations can also be used to transmit the data to the central ground station.

Data, such as the results of traffic counts and traffic observations, are collected regionally and then transmitted in time multiplex from the individual regional transmitting stations via the base stations to the central ground station. In the central ground station, the results of these data are evaluated and processed together with further data into the desired information such as traffic reports.

The expected data flow from the individual regions is relatively small. The number of regional transmitting stations is therefore made as large as possible and an access method to the base station selected such that the intended channel is occupied only when required. This is accomplished by an interrogation system wherein the individual stations (for example, about 50) are called up in succession by the central ground station following which each either transmits its data or the message "no data". The data is transmitted over a channel of about 0.5 . . . 1 MHz bandwidth, a transmission frequency in the GHz range being selected in order to prevent interference.

The control unit 10 consists of a microcomputer INTEL 8049. According to the number of area codes additional memories, e.g. INTEL 8155, are required.

The operating device 12 is a console comprising keys and luminous displays for the following functions:

frequency range selector radio:
2 lockable, interdependent releasing keys with luminous displays
switch radio/traffic information:
2 lockable, interdependent releasing keys with luminous display
channelselector:
2 keys (frequency "up"/"down")
channel identifier:
numerical two digit LED-display
volume controle unit:
potentiometer
code input:
numerical keyboard with keys 0 . . . 9, enter, clear entry, clear, local code (preset code) read memory check-back traffic message providing playback of stored traffic information:

key display member for recording and memory contents: numerical, e.g. 3 digits, LED-display The memory 15 consists of a special tape recorder employing an endless tape cassette, similar to the commercially available compact-cassette devices with the following specifications:

recording speed 2.4 cm/sec electromagnetic control of the mechanism "forward mode" (record and playback) "fast forward mode"

The control of these functions and the electrical operations "record", "playback" and "erase", is done by the control unit 10 via relays. Recording is provided by three tracks:

track 1: marker track track 2: record/playback 1 track 3: record/playback 2

The tape recorder comprises a 3 track head for this purpose.

Changeover from track 2 to track 3 and vice versa is done by a relay.

The other units (e.g. erase-, premagnetization-oscillator, record-, playback-amplifier) are commercially available conventional cassette recorder units.

For reception of the area codes and the "new or priority information" indication several methods are available. For example, an analog method, which generates sound modulated auxiliary carriers or subcarriers may be used. Such a method is used in the German traffic information system to identify traffic information broadcasting stations ("traffic information by tape", ARI-system, published in Funkschau 1971, Heft 7, page 193–194)

According to the number of area codes several subcarriers and/or several modulation frequencies are provided.

In a digital transmission system digital code words before and after the messages are transmitted.

Using an analog system evaluation of the area codes is made in decoder 11 in the same way as in conventional automobile radio sets with area identification.

Using a digital system evaluation of the area codes is made by comparing the received codeword with a known codeword, corresponding to the area code and which will be read out on request. For this purpose decoder 11 may comprise a simple correlator.

Correct reception of the transmissions is controlled with the aid of the received signal level (AGC) and the level of a subcarrier. If a threshold is passed for a certain time, which is to be determined by tests, a renewed recording of the following information will be made, although no priority information nor new information codes are received.

If an area code (priority information, new information) is identified by decoder 11, switch 14 (relay) is switched over and the memory 15 is activated (switch on "recording" and "forward mode").

Automatic switching of different area codes on longer trips is done in connection with the automobile odometer. For achieving this, the odometer comprises a contact which enables a pulse to be generated after every traversed kilometer of the route. By the control unit 10 the single pulses are counted, if needed. Respectively the actual area codes are read out of the code memory and are signalled to the decoder 11. Accordingly, the decoder 11 is able to compare the received information with the actual area code.

The use of a digital memory may be expensive for certain applications and therefore the following alternative may be used: Several words which are used within traffic informations are stored by the memory.

From the base station to the mobile stations only the word-codes are transmitted and stored by an intermediate memory. After activation by the driver those words stored in the memory are read out, which correspond with the transmitted word-code.

With the aid of a digital/analog converter the word-codes are changed to acoustic messages (principle of the "speaking calculator"). The intermediate memory for storing the transmitted word-codes operates as a stack-register and comprises two groups of memory lines, according to the number of traffic informations and information planes.

It will be understood that the above description of the present invention is susceptible to various modifications, changes and adaptations, and the same are intended to be comprehended within the meaning and range of equivalents of the appended claims.

What is claimed is:

1. A method of transmitting information from a central ground station to a plurality of mobile auxiliary ground stations via at least one base station, each of said auxiliary ground stations being located within the transmitting range of at least one of said base stations and being provided with a receiving device having a control unit and a memory, said method comprising the steps of:

transmitting from said central ground station a block of messages cyclically repeated within a time frame, each message including an address code corresponding to the area code of the region adjacent a corresponding base station, said block of messages being transmitted on a single frequency;

receiving said block of messages at each of said base stations;

transmitting from each of said base stations said received block of messages, said block of messages being transmitted on a single frequency;

receiving said block of messages at the receiving device of said auxiliary ground stations;

recording in said memory those received messages having a selected area code and controlling said memory with said control unit to effect said recording;

converting said recorded messages to an information signal;

recording changed messages having said selected area code and a changed signal associated therewith; and converting said recorded changed messages to an information signal and controlling said memory with said control unit to effect said converting of said recorded changed messages to said information signal.

2. A method of transmitting information as defined by claim 1 wherein the block of messages transmitted by said central ground station comprises data collected from a central station supplemented by data from regional stations, said regional stations being connected by a radio link with said central ground station via at least one of said base stations.

3. A method of transmitting information as defined by claim 1 or 2 wherein a plurality of blocks of messages are received by the receiving device of an auxiliary ground station located in the transition region between base stations having different area codes, the recording step of said method comprising the steps of:

recording a first block of messages in a first information storage element of said memory;

recording a second block of messages in a second information storage element of said memory, said first and second blocks of messages being converted to information signals on demand;

recording changed blocks of messages received during conversion of one of said first and second blocks of messages to information signals on the other of said information storage elements to provide simultaneous recording of said changed message and conversion of the initial message to information signals; and converting the block of changed messages recorded during conversion of said one block of messages to information signals.

4. A method of transmitting information as defined by claim 3 wherein said mobile auxiliary ground station moves along a predetermined route, said method comprising the additional steps of:

introducing the area codes along said route into the control unit of said auxiliary ground station; and identifying the movement of said auxiliary ground station into a region having one of said introduced area codes.

5. A method of transmitting information as defined by claim 3 wherein said memory is a solid state memory with digital recording.

6. A method of transmitting information as defined by claim 3 wherein said block of messages includes a priority signal, said block being recorded and converted to an information signal immediately after its receipt from said base station.

7. A method of transmitting information as defined by claim 1 wherein said base station is a terrestrial station.

8. A method of transmitting information as defined by claim 1 wherein said base station is a satellite.

9. A method of transmitting information as defined by claim 1 wherein said information signal is an audio signal.

* * * * *